Jan. 20, 1959 R. M. ALLEN 2,869,417
REFRACTOMETERS
Filed Jan. 9, 1956
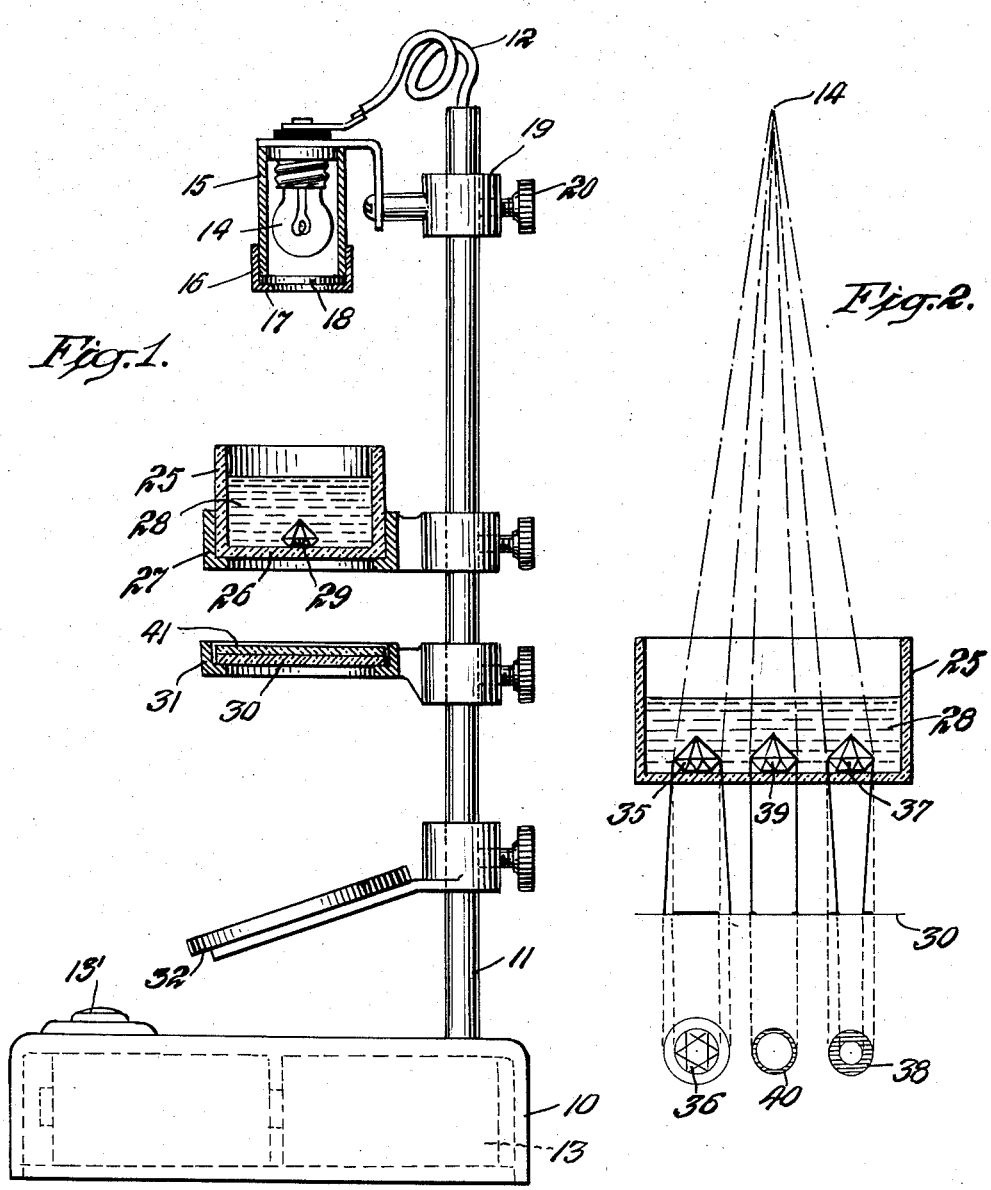
INVENTOR.
Roy M. Allen
BY
Fred'k F. Schuetz
ATTORNEY

United States Patent Office 2,869,417
Patented Jan. 20, 1959

2,869,417

REFRACTOMETERS

Roy M. Allen, Verona, N. J., assignor to R. P. Cargille Laboratories, Inc., New York, N. Y., a corporation of New York Application January 9, 1956, Serial No. 557,914

1 Claim. (Cl. 88—14)

The invention relates to a novel type of refractometer- "Refractoscope," particularly of the immersion type in which differences in refractive indices are measured by a projected image of the specimen. It has for an object to facilitate the testing of transparent crystals (gems), more especially with respect to their indices of refraction.

A further object of the invention is to amplify minute differences in refractive indices of a liquid medium and cut gems and other transparent material by means of a projected image of the material when immersed in said liquid medium.

It is an object, also, to detect defects in gems and the like by means of the novel "Refractoscope," as well as to determine whether the specimen is of a higher or lower refractive index than that of the said liquid medium employed and the approximate degree of any difference.

A still further object of the invention is to provide apparatus for the aforesaid purpose, which is simple to operate and which will afford visible and accurate indications, for ready viewing.

Another object of the invention is to provide a novel instrument including a mirror in which there is observable an image projected on a screen and affording distinguishing characteristics of the specimen under test.

Still another object of the invention is to provide means for varying the spacing between various components of the instrument, more especially the projecting light means and the screen, so as to establish the correct focal distances for securing a sharp image when there is a difference in the refractive indices of the specimen and the liquid medium.

The invention has for an object, furthermore, to associate with the novel apparatus a polarizing element or elements, thereby to render the novel apparatus suitable for discriminating between birefringent (double refractive crystals such as quartz, topaz, tourmaline) material and such as is refractive equally in all directions (isotropic, e. g., garnet, glass, etc.).

In carrying out the invention, the novel "Refractoscope" designed for examining crystals such as gems or other transparent material under light rays from a point source, comprises an optical system arranged vertically with respect to a transparent cell or tank in the refractive liquid of which is to be immersed the specimen or specimens, the light rays being directed therethrough to provide an image upon a ground glass and the said image being reflected therefrom by a mirror. Polarizing components may be associated with the aforesaid optical system.

The nature of the invention, however, will best be understood when described in connection with the accompanying drawings, in which:

Fig. 1 is a front elevation, partly in vertical section, of the novel apparatus.

Fig. 2 is a diagrammatic representation illustrating the testing operation with the novel apparatus.

Referring to the drawings, 10 designates the base of a stand to which an upright tube 11 is attached through which pass electrical conductors 12 connected to a suitable source of electrical power such, for example, as the battery 13. The latter is contained within the base, power therefrom being controlled by a pushbutton 13' and directed to a source of pin-point illumination such as the electric lamp 14. The latter is retained, for example, in a cylindrical housing 15 open at its lower end. It is preferred to provide at this end, as by frictionally fitting thereover, an axially perforated cap 16 having a circular inturned flange 17 upon which may be located a polarizing component as the disk 18 of polarizing material. Housing 15 is adjustable along the tube 11 through connection to block 19 slidable on the tube and held thereto by screw 20.

An immersion cell or tank 25 with transparent bottom 26 is similarly adjustably supported and beneath the light source 14 on tube 11, as through the annular frame 27, said tank being designed to retain the desired index liquid 28. It will be understood that the tank is to be located in the optical axis of the light source, the rays from which are designed to pass through a specimen 29 located on the bottom 26 to thereby project an image of the specimen, if the latter be not of the same refractive index, upon a ground glass screen 30 of an annular frame 31 which is also adjustable along the tube 11. Such image is then to be reflected by an inclined mirror 32 for convenient viewing, the mirror being likewise adjustable along tube 11.

In making a determination with the novel instrument, use is made of the principle that a transparent mineral (or other transparent substance) becomes invisible when immersed in a liquid of the same index of refraction.

With minute particles, slight differences in the indices can be determined under the microscope by means of the Becke line or oblique illumination, but with larger objects such as cut gems this is no longer feasible.

The novel instrument hereinbefore described is designed to amplify minute differences in refractive indices by means of a projected image of a gem (or other transparent material) when the same is immersed in the liquid medium. This amplification of minute differences in indices results from magnification accomplished through the appreciable space separating the specimen and its projected image. Minute differences are invisible when viewing the specimen directly in the liquid medium. Should the latter possess the higher index, when a light from the point source 14 is projected from above through the liquid and gem, the latter, as in the case of gem 35, Fig. 2, functions somewhat as a negative lens, scattering the light as is indicated by the image 36. Under the reverse condition, as in the case of the gem 37, it becomes a positive lens, bringing the light to a focus, as is indicated by the image 38. In other words, it provides a greatly magnified Becke effect.

The projected image is picked up on the ground glass screen 30 under the cell containing the immersion liquid and gem and viewed by means of the mirror 32. When the indices of the liquid and gem are identical, as in the case of the gem 39, the latter becomes invisible except for color and a thin spectral border 40 when white light is employed.

With any difference in the indices, the positive or negative appearance of the projected image is so characteristic that it immediately indicates what change in the liquid must be made to make it identical with the index of the gem, provided it is important that the exact index of the gem be ascertained. For ordinary use in the identification of gems, it often suffices to know that a given stone is lower or higher than a specific index.

The novel instrument is arranged to vary the spacing between the various components to aid in establishing the focal distance of a positive image, which indicates the extent of difference in the medium and gem. By the use of polarizing elements, which may be located above and below the cell as in the association of disk 18 with the source of light 14 and/or the disk 41 with the ground glass screen 30, there may be determined the degree or absence of polarization by using cross disks and rotating the cell.

It is also possible, as in the case of stones and the like which are pleiochroic, to identify by the use of the polarized disk 18 the nature of the pleiochroism. Under normal operations, the aforesaid polarizing disks 18 and 41 are not utilized.

I claim:

Vertically disposed optical apparatus for use with transparent crystalline material, comprising a point source of projection illumination, and means to energize the same; a housing for the illumination source, said housing having an opening in the optical axis of the illumination source; means removably associated with the housing at its opening to support light-polarizing means over said opening; an immersion cell with transparent bottom adapted for retaining liquid of known refractive index, and means to support the cell adjustably in the optical axis of the illumination source; a vertically adjustable ground glass screen located in said axis beyond the cell in the projection direction to receive a projected image of a specimen of crystalline material in the cell; a mirror also located similarly in said axis and beyond the screen to reflect images projected onto the screen; and removable light-polarizing means supported by the ground glass screen in the optical axis of the illumination source.

References Cited in the file of this patent

UNITED STATES PATENTS

| 1,766,037 | Dawson | June 24, 1930 |
| 2,418,463 | Coleman | Apr. 8, 1947 |

OTHER REFERENCES

Manual of Petrographic Methods, Johannsen, 2nd edition, McGraw-Hill, 1918, pgs. 256–259.